Sept. 9, 1941.  A. D. SIEDLE  2,255,441
REFRIGERATION
Filed July 20, 1938  3 Sheets-Sheet 1

INVENTOR
Arnold D. Siedle
BY Harry S. Dunarse
ATTORNEY

Patented Sept. 9, 1941

2,255,441

UNITED STATES PATENT OFFICE 2,255,441

REFRIGERATION

Arnold D. Siedle, Canton, Ohio, assignor to The Hoover Company, North Canton, Ohio, a corporation of Ohio Application July 20, 1938, Serial No. 220,192

15 Claims. (Cl. 62—5)

This invention relates to the art of refrigeration and more particularly to a novel control mechanism designed to regulate the operation of the refrigerating system.

It is a principal object of the present invention to provide a refrigerating control mechanism which will normally maintain a refrigerating apparatus between predetermined temperature limits which may be varied at will by the operator of the system by a simple manual manipulation. In addition, the control mechanism herein disclosed will automatically defrost the refrigerating system whenever the frost deposit on the evaporator reaches a predetermined depth.

It is a further object of the invention to provide a refrigerating control mechanism having a fully automatic defrosting means thereon which de-energizes the refrigerating system for defrosting purposes through the control mechanism normally controlling the apparatus but without interferring with the mechanism provided to transmit operative movements of the normal control thermostat to the energy controlling mechanism or to interfere with the adjusting mechanism for the normal controlling thermostat.

More specifically, it is an object of the invention to provide a refrigerating control mechanism in which the thermostatic element normally controlling such mechanism is maintained in operative position by a second thermostat which is operated only in response to a predetermined accumulation of frost on the evaporator to shift the normally controlling thermostat into an inoperative position.

In one form of the invention the control mechanism operates by allowing the normal controlling thermostat to move as a unit under the bias of the normal control adjusting spring in a direction to de-energize the system; or, viewed in another light, it allows the normally controlling thermostat to expand without affecting the energy supply to the refrigerating system. More specifically, the invention comprises a thermostatic control mechanism in which a bellows is connected to be responsive to the temperature of the element to be controlled and expands and contracts to operate an electrical switch and a gas valve through a snap acting mechanism and against the balance of an adjusting spring. The thermostat is held in position by a defrosting thermostat which will tend to collapse when a predetermined frost coat has formed on the evaporator and will thereafter permit the normally controlling bellows to expand without shifting the electrical switch and gas valve into operative condition.

Other objects and advantages of the invention will become apparent as the description proceeds when taken in connection with the accompanying drawings, in which.

Figure 1:
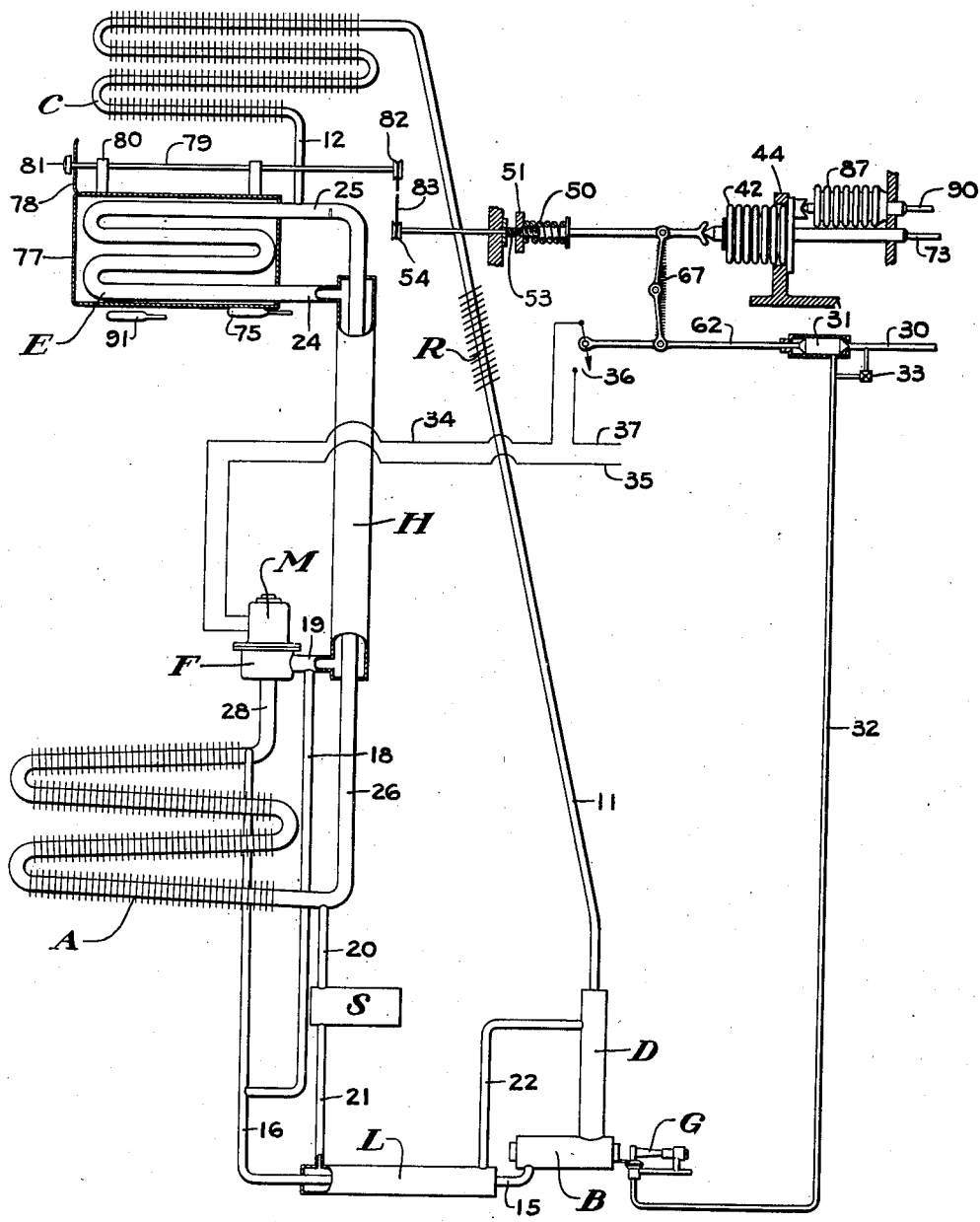
Figure 1 is a diagrammatic representation of the invention as the same is applied to a three-fluid absorption refrigerating system.

Referring now to the drawings and first to Figure 1, there is disclosed a continuous three-fluid absorption refrigerating system of the type utilizing a gas burner to generate refrigerant and an electric motor driven fan for circulating the inert gas. This refrigerating system has been selected by way of example only; the particular control mechanism disclosed herein is equally well applicable to other types of refrigerating systems.

The refrigerating system disclosed in Figure 1 comprises a boiler B, an analyzer D, an air-cooled rectifier R, a tubular air-cooled condenser C, an evaporator E, a gas heat exchanger H, a tubular air-cooled absorber A, a solution reservoir S, a liquid heat exchanger L, a gas burner G for heating the boiler, and a circulating fan F which is driven by an electrical motor M. These elements are suitably connected by various conduits to form a plurality of gas and liquid circuits constituting a complete refrigerating system to which reference will be made in more detail hereinafter.

The refrigerating system just described will be charged with a suitable refrigerant, such as ammonia, a suitable absorbent, such as water, and a suitable pressure equalizing medium, such as nitrogen.

Application of heat to the boiler B by the burner G liberates refrigerant vapor from the refrigerant absorbent solution therein contained. The refrigerant vapor so liberated passes upwardly through the analyzer D in counterflow relationship to the strong solution flowing downwardly therethrough. In the analyzer, further refrigerant vapor is generated from the strong solution by the heat liberated by condensation of absorption solution vapor. The refrigerant vapor is conveyed from the upper portion of the analyzer to the upper portion of the condenser by means of a conduit 11 which includes the air-cooled rectifier R. The rectifier serves to condense any absorption solution vapor which may pass through the analyzer. In the condenser, the refrigerant vapor is changed to the liquid phase by heat exchange with the cooling air flowing over the condenser. The refrigerant so liquified is discharged from the condenser into the evaporator through a conduit 12.

The lean absorption solution generated in the boiler by the liberation of refrigerant vapor is conveyed therefrom through a conduit 15, the liquid heat exchanger L, and a conduit 16 into the upper portion of the tubular absorber A. It is apparent that the absorber A is at an elevation above the liquid level prevailing in the boiler-analyzer system wherefore some means must be provided to elevate the weak solution into the absorber. For this purpose, a small bleed conduit 18 is connected between the gas discharge conduit 19 of the circulating fan F and the weak solution conduit 16 below the liquid level therein, whereby the weak solution is elevated into the absorber by gas lift action.

The weak solution flows downwardly through the absorber in counterflow relationship to a mixture of inert gas and refrigerant vapor which is flowing upwardly therethrough. The absorption solution absorbs the refrigerant vapor content of this mixture and the heat of absorption is rejected to the cooling air flowing over the cooling fins on the exterior of the absorber. The resulting strong solution flows to the bottom of the absorber and is drained through a conduit 20 into the solution reservoir S from which it is conveyed to the upper portion of the analyzer D through a conduit 21, the liquid heat exchanger L, and a conduit 22, thus completing the absorption solution circuit.

The lean pressure equalizing medium discharged by the fan F passes through the conduit 19 and the outer path of the heat exchanger H from which it flows into the bottom portion of the evaporator E through a conduit 24. The evaporator E may be of any desired type. As shown, it consists simply of a tubular coil section attached to a suitable housing for supporting ice trays and the like. Also, if desired, the evaporator may include a separate finned box-cooling section. The inert gas flows upwardly through the evaporator in counterflow relationship to liquid refrigerant flowing downwardly therethrough. The liquid evaporates into the inert gas to produce refrigeration. The resulting rich pressure equalizing medium refrigerant vapor mixture formed in the evaporator is discharged therefrom through a conduit 25 into the inner path of the gas heat exchanger H from which it is conveyed through a conduit 26 to the bottom portion of the absorber A. The inert gas refrigerant vapor mixture then flows upwardly through the absorber in counterflow relationship to the absorption solution in the manner described heretofore. The resulting lean gas formed in the absorber is conveyed from the upper end thereof to the suction inlet of the circulating fan F by a conduit 28.

Gaseous fuel is supplied to the burner G from a supply conduit 30, a gas valve 31, and a conduit 32. The gas burner includes any suitable form of safety cut-off mechanism which is operable completely to discontinue the supply of gas thereto upon flame failure. A small by-pass 33 is provided around the valve 31 in order to provide a small igniting flame on the burner G during periods when the valve 31 is in closed position.

The circulating motor M is connected directly to an electrical supply wire 35 and to an electrical switch 36 by a wire 34. The other terminal of the switch 36 is connected to the supply wire 37.

The control mechanism per se is only diagrammatically illustrated in Figure 1, hence it will be described in detail in connection with Figure 2, suitable reference being made to the essential elements thereof appearing in Figure 1.

The control mechanism is housed within a suitable casing 40 to which the gas valve 31 is attached in any desired manner. The operative element of the control mechanism comprises a bellows 42 which is provided with a cylindrical base portion 43 slidably mounted in an upstanding support 44 formed integrally with the casing 40. The cylindrical element 43 is provided with a flange 45 of a size sufficient to abut the element 44 and to limit the movement of the bellows to the left as viewed in Figure 2. The free end of the bellows 42 is provided with a hardened steel bearing point 46 which is received in a bearing cup 47 carried by the actuating arm 48 of a snap acting mechanism. The arm 48 is pivotally mounted on the wall of the casing 40 at 49. The opposite side of the arm 48 bears against an adjusting spring 50 which in turn bears against an adjusting nut 51 which is threadedly engaged with an adjusting screw 53. The adjusting screw 53 is suitably mounted in the wall of the casing 40 and carries an actuating pulley 54 on the protruding end thereof. The adjusting nut 51 is prevented from turning with the adjusting screw 53 by engagement with a stop lug 55 formed integrally with the casing 40.

The electrical switch 36 is suitably carried by a bracket 56 mounted on the inner wall of the casing 40 and is provided with an upstanding arm 57 positioned in the path of movement of an insulating plug 58 which is carried by a follower 60. The opposite end of the follower 60 is provided with an upstanding portion 61 which is positioned to abut the stem 62 of the valve 31 which passes through the wall of the casing 40 and is suitably journaled therein. A small pressure spring 64 is mounted within the housing 40 to urge the stem 62 in a valve-closing direction. The arm 60 is supported on a pair of levers 65, only one of which is shown, which are pivotally mounted in the casing 40. The free end of the actuating arm 48 engages a snap spring 67 which also engages the follower 60 whereby movement of the arm 48 is transmitted with a snap action through the spring 67 to the follower 60 for operating the switch 36 and the valve 31.

Figure 2:
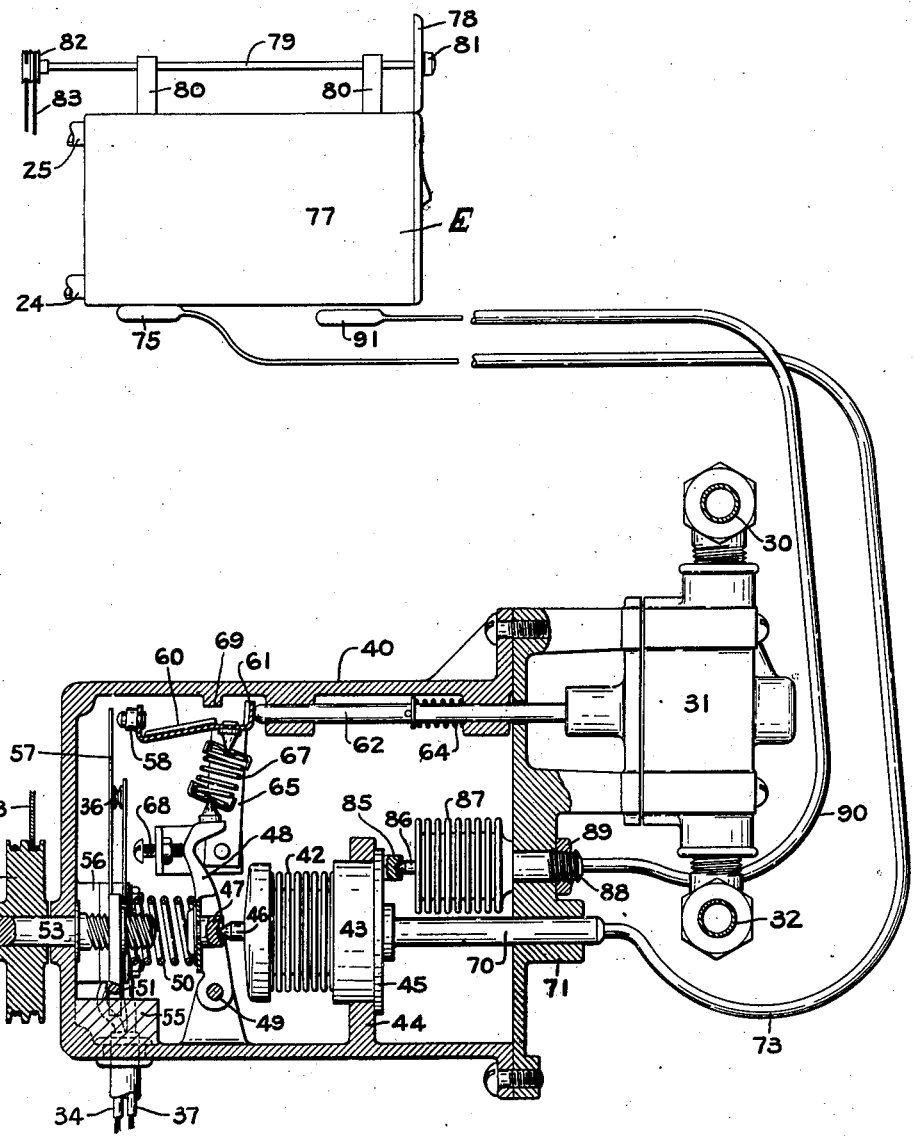
Figure 2 is a fragmentary sectional view on an enlarged scale of the control mechanism per se.

An adjustable stop 68 is provided to limit movement of the arm 48 in a counter-clockwise direction as viewed in Figure 2. A suitable stop lug 69 is mounted on the wall of the casing 40 to limit movement of the follower 60 in a counter-clockwise direction as viewed in Figure 2.

The bellows 42 is provided with an elongated fluid conduit 70 which is slidably received in a journal lug 71 formed integrally with the wall of the casing 40. Exteriorly of the casing 40 the conduit 70 connects with a capillary conduit 73 which terminates in a bulb element 75 positioned in contact with the evaporator whereby temperature changes in the evaporator cause changes in the pressure within the bellows with consequent expansion or contraction of the bellows 42.

The evaporator E is housed within a suitable casing 77 which is provided with an upstanding control panel 78. A control shaft 79 extends across the top of the evaporator from which it is supported by a pair of journal brackets 80. One end of the shaft 79 extends through the panel 78 and carries an adjusting knob 81 which may cooperate with suitable indicia formed on the outer surface of the panel 78. The opposite end of the shaft 79 carries a pulley 82 around which is wrapped a motion transmitting cord 83. The motion transmitting cord 83 is also wrapped around the pulley 54 whereby rotation of the knob 81 advances or retracts the adjusting nut 51 by rotation of the screw 53 and thereby alters the compression of the adjusting spring 50.

The bellows plate 45 is provided with a bearing cup 85 which receives a bearing point 86 carried on one end of an expansible bellows 87. The bellows 87 abuts the inner wall of the casing 40. The bellows 87 is provided with a supporting conduit element 88 which extends through an opening in the wall of the casing 40 and receives a clamping nut 89. Exteriorly of the casing 40 the conduit 88 terminates in a capillary tube 90 which communicates with a bulb element 91. The bulb 91 is supported in any suitable manner a slight distance from the surface of the casing 77 whereby it may ultimately be contacted by frost deposited on such casing.

The operation of this invention will now be described. During normal operation of the apparatus temperature changes in the evaporator produce corresponding pressure changes in the bulb 75 which are transmitted through the capillary tube 73 to cause expansion and contraction of the bellows 42. Such expansion and contraction of the bellows actuates the switch 36 and the valve 31 through the snap-acting mechanism to energize and de-energize the refrigerating system as conditions may require. The temperature limits within which the bellows 42 maintains the evaporator may be varied by suitable manipulations of the knob 81 which in turn alters the compression of the adjusting spring 50, thereby changing the pressure which must be produced in the bellows in order to actuate the snap-acting mechanism.

Continued operation of the refrigerating system in the manner above described eventually causes frost to deposit on the casing 77. Continuous deposit of frost will eventually cause the frost coat to build out and contact the bulb 91, thereby causing a large decrease in pressure in the bulb 91, the capillary tube 90, and the bellows 87. When this occurs, the bellows 87 collapses and the bellows 42 then moves bodily to the right, as viewed in Figure 2, under the bias of the adjusting spring 50. This movement also shifts the cylindrical collar 43, bearing plate 45 and fluid conduit 70 to the right, as viewed in Figure 2, as these elements are rigid with the bellows 42. The collar 43 slides in the guide 44 to keep the bellows in alignment with the spring 50. Movement of the bellows and the arm 48 to the right, under the bias of spring 50 as viewed in Figure 2, actuates the snap-acting mechanism to cause opening of the switch 36 and closure of the valve 31, thereby de-energizing the refrigerating system. The apparatus will remain in this condition until the frost coat of the evaporator has melted free thereof whereupon the pressure within the system including the bulb 91, the capillary tube 90 and the bellows 87 will increase with resulting expansion of the bellows 87. Expansion of the bellows 87 will apply sufficient force to the plate 45 to force the same against the supporting ring 44, thereby returning the apparatus to normal condition.

The thermal characteristics of the bellows 42 and 87 are necessarily different because of the different functions which they perform. The bellows 42 will never develop sufficient pressure to collapse the bellows 87 unless it shall have actuated the snap-acting mechanism to position to close the switch 36 and to open the valve 31 against the greatest possible compression which can be placed upon the spring 50 by the adjusting nut 50. On the other hand, the bellows 87 is designed to collapse quickly when the bulb 91 is contacted by the frost coat on the evaporator whereby there is substantially no resistance to movement of the bellows 42 to the right, as viewed in Figure 2, when such contact between the bulb 91 and the frost coat occurs.

If the bellows 87 is smaller in diameter than the bellows 42, as illustrated in Figures 1 and 2, the fluid charges of the two bellows should be so related that the total force exerted by the bellows 42 will exceed the total force exerted by the bellows 87 when each bellows is responding to the temperature of the frost coat on the evaporator—that is, a temperature below 32° F. To produce this result, the unit pressure exerted by the fluid in the bellows 87 should decrease more rapidly with falling temperatures than the unit pressure of the fluid charge in the bellows 42.

If the bellows 87 and 42 are of the same diameter the same relationship of pressures should prevail except that the unit pressure temperature curves of the bellows 87 should cross and drop below that of the bellows 42 at the temperature at which the bellows 42 is to overcome the bellows 87.

The above described refrigerating control mechanism is particularly advantageous for the reason that defrosting is accomplished by de-energizing the refrigerating system through the means normally controlling the energization thereof to maintain the evaporator between predetermined temperature limits without complicating the normally controlling and adjusting mechanism in any manner or requiring any change in the normal adjusting of the mechanism. Additionally, no excessive strains are imposed upon the normally controlling bellows during the defrosting period for the reason that these bellows are free to move through a relatively wide range of movement without operating the mechanism controlling the energization of the refrigerating system.

Figure 3:
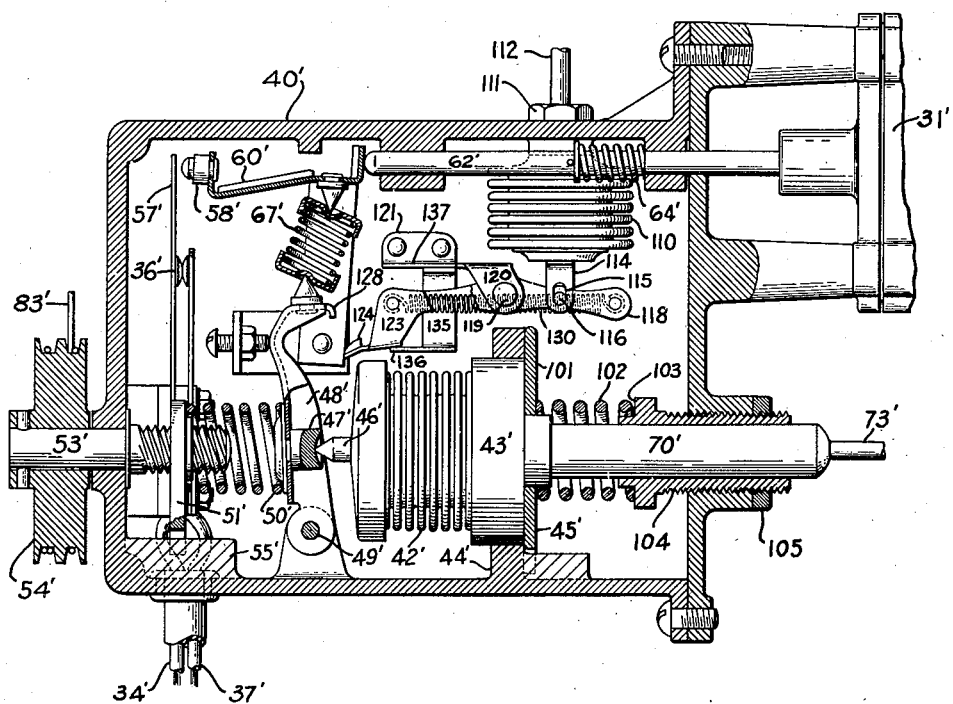
Figure 3 is a partial sectional view on an enlarged scale of a modified form of control mechanism.

Referring now to Figure 3, there is disclosed a modified form of the invention. This form of the invention is designed and intended to be utilized with the refrigerating system disclosed in connection with Figure 1 and will control the refrigerating apparatus in substantially the same manner.

Certain portions of the control mechanism illustrated in Figure 3 are identical with portions of the apparatus illustrated in Figures 1 and 2. Such identical portions of the two embodiments of the invention have been given the same reference characters primed in Figure 3.

In this form of the invention the cylindrical portion of the bellows 42', which is slidably mounted in the supporting element 44', abuts a spring retaining plate 101. A stiff spring 102 surrounding a portion of the conduit 70' abuts the spring retaining plate 101 and a spring retaining shoulder 103 formed on an adjusting and supporting bolt 104 which slidably receives the element 70'. The adjusting bolt 104 is threadedly received in a shoulder formed on the end wall of the casing 40' and is secured in adjusted position by a lock nut 105.

In this form of the invention the defrosting bellows 87 is replaced by a mechanism now to be described. A defrosting bellows 110 is rigidly mounted in the top wall of the casing 40' by means of a nut 111. A capillary tube 112 is connected to the bellows 110 and at its opposite end connects to a bulb element corresponding exactly with the bulb element 91 previously described. The free end of the bellows 110 is provided with an actuating arm 114 which has a slot 115 formed in its end portion. The slot 115 receives a pin 116 which extends outwardly from an actuating link 118. The actuating link 118 is pivotally mounted at 119 on a supporting arm 120 of a bracket 121 which is secured to the side wall of the casing 40' in any suitable or desired manner. A latching arm 123 is also pivotally mounted on the supporting arm 120 at 119 and is provided on its free end portion with a latch keeper 124. The latch keeper 124 is positioned to engage a latching element 128 which is formed on the free end of the snap acting element 48'. As illustrated in Figure 3, the surface of the latch keeper 124 which faces the element 48' is tapered downwardly and away from the body of the latching arm 123. The tapered portion of the latch keeper 124 terminates in a substantially vertically extending portion as illustrated.

A toggle spring 130 is connected between the free ends of the latching arm 123 and the actuating arm 118.

The bracket 121 also includes a downwardly extending portion 135 which is provided with a foot element 136 extending into the path of movement of the latching arm 123 in a downward direction. Upward movement of the latching element 123 is limited by a shoulder 137 formed on the bracket 121.

The operation of this form of the invention will now be described. During normal operation of the apparatus this control mechanism operates identically with that disclosed in connection with Figures 1 and 2 to energize and de-energize the refrigerating system in accordance with refrigerating demand. As frost accumulates on the evaporator it eventually contacts the bulb elements associated with the bellows 110 and causes that bellows to contract. Contraction of the bellows 110 swings the actuating arm 118 in a counterclockwise direction, as viewed in Figure 3, due to the linkage connection 114, 115, 116. As the arm 118 moves the toggle spring 130 past the center line position, the force of the toggle spring snaps the latching arm 123 upwardly in a clockwise direction, as viewed in Figure 3, into contact with the stop 137. If the bellows 42' has collapsed to permit the snap acting mechanism to open the switch 36' and to permit the valve 31' to close under the bias of the adjusting spring 50', the latch keeper 124 will engage to the left of the latch element 128, as viewed in Figure 3. If the bellows 42' is in expanded position when the latching arm 123 is actuated to latching position by the bellows 110, there will be no immediate cooperation between the latching devices 128 and 124. However, immediately the bellows 42' contracts to a position causing de-energization of the circulating motor and the gas burner, the latching element 128 will ride over the facing inclined portion of the latch keeper 124 and will snap behind the vertical face thereof, whereby the snap-acting element 48' will be latched in a position to prevent movement thereof in a counterclockwise or energizing direction, as viewed in Figure 3.

Under whichever set of circumstances the elements 124 and 128 arrive in latching engagement, the arm 48' will be absolutely locked against movement in a counterclockwise direction under the bias of the bellows 42'. With the control mechanism thus locked in defrosting position, the evaporator temperature will increase sufficiently to free itself of frost. However, as the evaporator temperature increases in this manner, the pressure within the bellows 42' reaches a relatively high value. In order to protect the system against undesirable results of such pressures, the bellows 42' will expand to the right, as viewed in Figure 3, against the bias of the defrosting spring 102 which is sufficiently stronger than the adjusting spring 50' to insure that the ring 44' and plate 101 will remain in contact during normal operation. This device prevents excessively high pressures from developing in the bellows 42' though it may be omitted, if desired, in which event the bellows collar 43' will be rigidly mounted in the supporting ring 44'.

The apparatus continues in the above described position until such time as the evaporator shall be substantially entirely freed of frost, whereupon the pressure within the bellows 110 will have increased to a value sufficient to cause the same to expand and to move the actuating arm 118 in a clockwise direction, as viewed in Figure 3, through the linkage 114, 115 and 116. When the arm 118 moves in a clockwise direction it also shifts the toggle spring 130 over center in a downward direction which thereby causes the force of the toggle spring to snap the latching arm 123 in a counterclockwise direction, as viewed in Figure 3, which will release the latching engagement between the elements 128 and 124. When the latching engagement between the elements 128 and 124 has been broken, the spring 102 immediately forces the retaining plate 101 against the bellows supporting and guiding ring 44', thereby restoring the bellows 42' to normal position and restoring the apparatus to normal control.

In this form of the invention there need be no particular relationship between the characteristics of the two bellows 42' and 110 for the reason that these bellows do not directly oppose each other. It is only necessary that the bellows 110 develop sufficient force to move the actuating arm 118 against the bias of the toggle spring 130.

In this form of the invention there is provided an automatic defrosting mechanism which is sure in operation and which positively locks the apparatus in defrosting position and positively releases the same at the end of the defrosting period without interferring with the setting of the normal control mechanism, which is entirely independent of the setting of the normal control mechanism and which permits the normal control bellows to expand freely under the high pressures developed therein during the defrosting cycle. It is further to be noted that the defrosting mechanism in this form of the invention does not interfere or modify the connection between the normally controlling bellows and the switch and gas valve actuating element other than to lock one element of the actuating mechanism in a particular position.

In each form of the invention above described there is provided a control mechanism including an automatic defrosting device which is wholly independent of the setting of the normally controlling adjustment, which does not modify the linkage connection between the normal controlling bellows and the energy control elements, which does not modify the connection between the temperature adjusting mechanism and its associated thermostatic mechanism and which insures that the normally controlling bellows will not be subjected to excessive and disruptive forces during the defrosting cycle. In addition, the above described mechanisms are certain in operation and are mechanically simple.

While I have illustrated and described a particular embodiment of my invention, the invention is not to be limited thereto but may be embodied in other constructional forms and variations without departing from the spirit of the invention or the scope of the appended claims.

I claim:

1. Refrigerating apparatus comprising a cooling unit, means for supplying a cooling medium to said cooling unit, means for controlling the operation of said cooling medium supply means, refrigeration demand responsive means for operating said control means, thermostatic means for holding said refrigeration demand responsive means in operative position, said thermostatic means being operative to allow movement of said refrigeration demand responsive means to an inoperative position in response to the formation of a predetermined depth of frost on said cooling unit.

2. Refrigerating control mechanism comprising a thermostatic element adapted to expand and contract in response to temperature variations, means for applying a variable resisting force to expansive movement of said thermostatic means to vary the operative temperature limits thereof, a defrosting thermostatic means holding said first mentioned thermostatic means in a fixed position and adapted to permit bodily movement of said first mentioned thermostatic means under the bias of said resisting force applying means when said defrosting thermostatic means is contracted.

3. Refrigerating control mechanism comprising an energy supply control means, a pressure sensitive bellows adapted to expand and contract in response to temperature changes in an element to be controlled, a snap acting mechanism connected to transmit controlling movements of said bellows to said energy supply control means, a spring for opposing expansive movement of said bellows, means for adjusting the compression of said spring to vary the operative temperature limits of said bellows, means slidably mounting said bellows, a defrosting thermostat mounted to maintain said bellows in operative position and adapted to permit bodily movement of said bellows under the bias of said adjusting spring when said defrosting thermostat is contracted.

4. Refrigerating control mechanism comprising energy supply control means, an expansible bellows, means for transmitting expanding and contracting movements of said bellows to said energy supply control means, a variable adjusting spring opposing expansive movement of said bellows, a normally expanded defrosting thermostat mounted to urge said bellows in a direction to increase the compression of said variable adjusting spring, means limiting movement of said bellows under the bias of said defrosting thermostat, and means slidably mounting said bellows, the arrangement being such that said bellows moves bodily in a direction to de-energize said energy supply control means under the bias of said spring when said normally expanded thermostat is contracted.

5. Refrigerating apparatus comprising a cooling unit, means for supplying a cooling medium to said cooling unit, means for controlling the operation of said cooling medium supply means, refrigeration demand responsive means for operating said control means, defrosting means for rendering said demand responsive means inoperative to operate said control means to cooling medium supplying condition, and means providing for movement of said demand responsive means in an abnormal direction when said defrosting means is operative to relieve said refrigeration demand responsive means of thermal strains incident to high defrosting temperatures in said cooling unit.

6. Refrigerating apparatus comprising a cooling unit, means for supplying a cooling medium to said cooling unit, means for controlling the operation of said cooling medium supply means, a temperature responsive bellows for operating said control means, defrosting means for rendering said bellows unable to operate said control means, and means providing for expansion of said bellows during the defrosting period in a direction opposite to its normal expanding direction to relieve said temperature responsive bellows of thermal strains incident to high defrosting temperatures in said cooling unit.

7. Refrigerating apparatus comprising a cooling unit, means for supplying a cooling medium to said cooling unit, means for governing the operation of said cooling medium supply means comprising a pressure sensitive bellows, means slidably mounting one end of said bellows, means connected to the other end of said bellows for transmitting operative movements thereof to said governing means, a spring opposing the slidably mounted end of said bellows, a defrosting thermostat, and means operated by said defrosting thermostat for latching the said other end of said bellows in fixed position in response to a predetermined frost deposit on said cooling unit.

8. Refrigerating apparatus comprising a cooling unit, means for supplying a cooling medium to said cooling unit, means for controlling the operation of said cooling medium supply means, refrigeration demand responsive means for operating said control means, defrosting means adapted to latch said connecting means in position to render said cooling medium supply means inoperative, said defrosting means comprising a latching element on said connecting means, a latch keeper adapted to cooperate with said latching means to latch said connecting means, a defrosting thermostatic element, a toggle operating connection between said thermostat and said latch keeper and means mounting said refrigeration demand responsive means for movement in response to defrosting temperatures on said cooling unit without operating said control means.

9. Refrigerating apparatus comprising a cooling unit, means for supplying a cooling medium to said cooling unit, means for governing the operation of said cooling medium supply means comprising a pressure sensitive bellows, means slidably mounting one end of said bellows, means connected to the other end of said bellows for transmitting operative movements thereof to said governing means, a defrosting thermostat normally opposing the slidably mounted end of said bellows, whereby said bellows may expand by moving the slidably mounted end thereof without affecting said governing means when said defrosting thermostat has responded to a frost deposit on said cooling unit.

10. Refrigerating apparatus comprising a cooling unit, means for supplying a cooling medium to said cooling unit, refrigeration demand responsive means for governing said cooling medium supply means and operatively connected thereto, defrosting means including a frost depth responsive control thermostat for rendering said refrigeration demand responsive means unable to govern said cooling medium supply means to supply cooling medium to said cooling unit, and means movably mounting said refrigeration demand responsive means to permit the same to move in an abnormal direction under the stress of a defrosting temperature condition at said cooling unit.

11. Refrigerating control mechanism comprising an energy supply control means, a normally controlling thermostatic element connected to operate said energy supply control means, a spring biasing said energy supply control means against the bias of said thermostat to a position to interrupt energy supply, means mounting said thermostat in a manner to allow the same to move under the bias of said spring to an inoperative position, a defrosting thermostatic element arranged to maintain said normally controlling thermostat in operative position and to allow movement thereof to said inoperative position when said defrosting thermostat is responding to a thermal condition induced therein by a defrosting demand.

12. Refrigerating control mechanism comprising an energy supply control means, a pressure sensitive thermostatic bellows connected to operate said energy supply control means by expansible and contractible movements of said bellows to energy supplying and energy supply interrupting positions respectively, and a defrosting thermostatic mechanism responsive to a condition indicative of a need for defrosting constructed and arranged to provide for expansive movement of said bellows in response to a temperature above that normally maintained by said bellows without operating said energy supply control means to energy supply interrupting position.

13. Refrigerating apparatus comprising a cooling unit, a cooling medium supply means for said cooling unit, means for governing said cooling medium supply means, a thermostat operatively connected to said governing means for maintaining a predetermined temperature condition at said cooling unit, a defrosting thermostat arranged to render said first mentioned thermostat inoperative to actuate said governing means to supply cooling medium to said cooling unit in response to the formation of a predetermined quantity of frost on said cooling unit, and means mounting said first mentioned thermostat for allowing movement of the latter under the stress produced by a defrosting temperature at said cooling unit in a manner not effective to operate said governing means.

14. Refrigerating apparatus comprising a cooling unit, a cooling medium supply means for said cooling unit, means for governing said cooling medium supply means, a thermostat operatively connected to said governing means for maintaining a predetermined temperature condition at said cooling unit, a defrosting thermostat, means operable by said defrosting thermostat for securing said governing means in non-cooling medium supplying condition when said defrosting thermostat responds to a defrosting demand from said cooling unit, and means mounting said first mentioned thermostat for allowing movement of the latter under the stress produced by a defrosting temperature at said cooling unit in a manner not effective to operate said governing means.

15. Refrigerating apparatus comprising a cooling unit, means for supplying a cooling medium to said cooling unit, means for controlling the operation of said cooling medium supply means to regulate the production of refrigeration, a pressure sensitive bellows arranged to be responsive to refrigeration demand, means slidably mounting one end of said bellows, means operatively connecting the other end of said bellows to said cooling medium supply controlling means whereby expansion of said bellows normally operates said cooling medium supply controlling means to cooling medium supplying position, a spring opposing expansive movement of said bellows in a direction to operate said cooling medium supply controlling means to cooling medium supplying position, a defrosting thermostat operable in response to the accumulation of a predetermined deposit of frost on said cooling unit to render said bellows incapable of expanding against the bias of said spring in a direction to operate said cooling medium supply controlling means to cooling medium supplying position whereby the slidably mounted end of said bellows is moved in a direction opposite to the normal direction of expansive movement thereof to allow said bellows to respond to pressures induced therein when said defrosting thermostat is operative without operating said cooling medium supply controlling means.

ARNOLD D. SIEDLE.